United States Patent
Axen et al.

(10) Patent No.: US 10,562,007 B2
(45) Date of Patent: Feb. 18, 2020

(54) SEPARATION MATRIX

(75) Inventors: Andreas Axen, Uppsala (SE); Jan Bergstrom, Uppsala (SE); Gunnar Glad, Uppsala (SE); Bo-Lennart Johansson, Uppsala (SE); Nils Norrman, Uppsala (SE)

(73) Assignee: GE Healthcare BioProcess R&D AB, Uppsala (SE)

( * ) Notice: Subject to any disclaimer, the term of this patent is extended or adjusted under 35 U.S.C. 154(b) by 427 days.

(21) Appl. No.: 12/667,873

(22) PCT Filed: Jul. 22, 2008

(86) PCT No.: PCT/SE2008/000461
§ 371 (c)(1),
(2), (4) Date: Jan. 6, 2010

(87) PCT Pub. No.: WO2009/014481
PCT Pub. Date: Jan. 29, 2009

(65) Prior Publication Data
US 2010/0320149 A1 Dec. 23, 2010

(30) Foreign Application Priority Data

Jul. 25, 2007 (SE) ...................................... 0701802

(51) Int. Cl.
*B01D 15/36* (2006.01)
*B01J 20/289* (2006.01)
*B01J 20/32* (2006.01)

(52) U.S. Cl.
CPC .......... *B01J 20/289* (2013.01); *B01D 15/362* (2013.01); *B01D 15/363* (2013.01); *B01J 20/328* (2013.01); *B01J 20/3274* (2013.01)

(58) Field of Classification Search
CPC .... B01J 20/289; B01J 20/3274; B01J 20/328; B01D 15/36; B01D 15/361; B01D 15/362; B01D 15/363; B01D 15/364
(Continued)

(56) References Cited

U.S. PATENT DOCUMENTS 3,489,699 A 1/1970 Battaerd et al.
4,540,486 A * 9/1985 Ramsden .................. 210/198.2
(Continued)

FOREIGN PATENT DOCUMENTS

EP  0266580 A2  5/1988
EP  0328256      8/1989
(Continued)

OTHER PUBLICATIONS

Caligur, Vicki, "Dextran and Related Polysaccharides" BioFiles 2008, 3.10, 17.*
(Continued)

*Primary Examiner* — Lucas A Stelling
(74) *Attorney, Agent, or Firm* — Eversheds Sutherland (US) LLP (57) ABSTRACT

The present invention relates to a separation matrix, which comprises a support; extenders coupled to an outer part of said support; and ligands coupled to said extenders, wherein the part of the support to which the extenders are coupled constitutes less than 50% of the volume of the separation matrix. The invention also embraces a method of preparing such a separation matrix, as well as a process wherein the separation media is used.

20 Claims, 1 Drawing Sheet

(58) Field of Classification Search
USPC .................................................... 210/198.2
See application file for complete search history.

(56) References Cited

U.S. PATENT DOCUMENTS

| | | | |
|---|---|---|---|
| 4,927,879 A * | 5/1990 | Pidgeon | ........................ 525/54.1 |
| 5,283,123 A | 2/1994 | Carter et al. | |
| 6,039,876 A | 3/2000 | Yang | |
| 6,426,315 B1 | 7/2002 | Bergstrom et al. | |
| 6,428,707 B1 | 8/2002 | Berg et al. | |
| 6,572,766 B1 | 6/2003 | Bergstrom et al. | |
| 6,602,990 B1 | 8/2003 | Berg | |
| 7,008,542 B2 | 3/2006 | Belew et al. | |
| 7,214,321 B2 | 5/2007 | Belew et al. | |
| 7,608,187 B2 * | 10/2009 | Axen et al. | ................... 210/635 |
| 2005/0242037 A1 | 11/2005 | Berg et al. | |
| 2007/0212540 A1 * | 9/2007 | Cheng | ................... B01J 20/262 |
| | | | 428/402 |

FOREIGN PATENT DOCUMENTS

| | | |
|---|---|---|
| EP | 1 764 152 | 3/2007 |
| WO | 98/33572 | 8/1998 |
| WO | 00/57982 | 10/2000 |
| WO | WO 01/38228 | 5/2001 |
| WO | WO 03/024588 | 3/2003 |
| WO | 2006/033634 | 3/2006 |
| WO | WO 20061043896 | 4/2006 |
| WO | 2007/058599 | 5/2007 |

OTHER PUBLICATIONS

Chinese Search Report and Written Opinion issued in connection with corresponding CN Application No. 200880100334.9 dated Feb. 19, 2013.
Office Action issued in EP 08794090.4 dated (Feb. 25, 2016).

* cited by examiner

SEPARATION MATRIX

CROSS-REFERENCE TO RELATED APPLICATIONS

This application is a filing under 35 U.S.C. § 371 and claims priority to international patent application number PCT/SE2008/000461 filed Jul. 22, 2008, published on Jan. 29, 2009, as WO 2009/014481, which claims priority to patent application number 0701802-1 filed in Sweden on Jul. 25, 2007.

FIELD OF THE INVENTION

The present invention relates to a novel separation matrix, which is useful various processes for the isolation of target compounds, usually biomolecules from liquids. The separation matrix according to the invention provides a very beneficial binding capacity, and it allows fast equilibration, both of which benefits process economy especially in large scale purification of biomolecules. The invention also encompasses a method of preparing such a separation matrix as well as a process of separating a target compound from a liquid using the present separation matrix.

BACKGROUND OF THE INVENTION

In the biotechnology field today, one of the most widely used separation methods is chromatography. The term chromatography embraces a family of closely related separation methods. The feature distinguishing chromatography from most other physical and chemical methods of separation is that two mutually immiscible phases are brought into contact wherein one phase is stationary and the other mobile. The sample mixture, introduced into the mobile phase, undergoes a series of interactions i.e. partitions many times between the stationary and mobile phases as it is being carried through the system by the mobile phase. Interactions exploit differences in the physical or chemical properties of the components in the sample. These differences govern the rate of migration of the individual components under the influence of a mobile phase moving through a column containing the stationary phase. Separated components emerge in a certain order, depending on their interaction with the stationary phase. The least retarded component elutes first, the most strongly retained material elutes last. Separation is obtained when one component is retarded sufficiently to prevent overlap with the zone of an adjacent solute as sample components elute from the column.

The chromatographic methods suggested up to date are based on different modes of interaction with a target. Thus, for example, in ion-exchange chromatography, the functional groups are permanently bonded ionic groups with their counter ions of opposite charge, while in hydrophobic interaction chromatography (HIC), the interaction between the stationary phase and the component to be separated is based on hydrophobic. Other chromatographic separation principles are well known to the skilled person.

The stationary phase, also known as the separation matrix, comprises a support, which is commonly a plurality of essentially spherical particles, and ligands coupled to the support. In most separation matrices, the support is porous to allow a larger amount of ligand and consequently more bound target compound in each particle.

U.S. Pat. No. 6,428,707 (Amersham Biosciences AB) relates to a process for the separation of a substance by adsorption to non-packed beds containing beads which exhibit ligands with affinity to the substance. The disclosed process is stated to improve total yields in adsorption processes on fluidized beds; improve productivity on fluidized beds and provide matrices that have improved breakthrough capacity in fluidized beds. This was achieved according to the inventors by utilizing beads in which the ligand is linked to the base matrix of the beads via an extender. The positive effect noted in this patent and caused by the extender is according to the patent believed to reside in the fact that it will provide the inner surfaces (pore surfaces) and/or outer surfaces of the beads with a flexible polymer layer that is permeable to macromolecules and other molecules allowed to pass the bed, causing an increase in the effective interacting volume as well as in the steric availability of the ligands which in turn increases the mass transfer rate as well as the total capacity.

EP 1 764 152 (Millipore Corporation) relates to asymmetric porous adsorptive beads, which comprise first and second regions. At least one characteristic differentiates the first from the second region, which characteristic may be pores size distribution, ligand density, ligand type, ligand mixture, media material, and percent agarose.

U.S. Pat. No. 6,572,766 (Bergstrom et al) relates to a matrix including a core showing a system of micropores and a surface in which the micropore system has openings. According to this patent, it was possible to achieve co-operation of different separation principles on the same chromatographic medium and in this way reduce the number of necessary separation steps in a purification process. More specifically, this was achieved by coating the surface with a polymer having such a large molecular weight that it cannot penetrate into the micropores. Interesting micropores are in several cases smaller than 1 μm, but can also be larger, depending on the intended use of the finished matrix. The micropores correspond in many cases to diffusion pores.

U.S. Pat. No. 6,426,315 (Bergstrom et al) relates to process for preparing multifunctional porous matrices, and more specifically, to a process of introducing layered functionalities by introducing a desired functionality in one or more well defined layers in the matrix. This can be obtained by contacting a matrix with a functional deficiency of reagent I, and choosing conditions and reagent I so that the reaction between reagent I and the groups A is more rapid than diffusion of reagent I in the matrix. In many embodiments of the matrices of the invention, the substitution degree of a ligand in the surface layer is zero or close to zero, while at the same time the same ligand is present in an inner layer. Also the reversed can be true. According to this patent, ligands are typically coupled to the matrix via a bridge which can be of varying structure according to known techniques. The bridge structure can be polymeric, e.g. a hydrophilic or a hydrophobic polymer. Common bridge names have been "tentacles", "extender", "fluff", "linker", "spacer" etc. Examples of hydrophilic polymer bridges are polysaccharides, such as dextran, and other water soluble polyhydroxy polymers. The requirements concerning the porosity (exclusion limit) of the separation matrices are primarily determined by mole weight and shape of the compounds which are to be separated. For the invention, it is also important that the porosity shall permit transport within the matrix of reagent I and often also of compound B.

U.S. Pat. No. 4,927,879 (Pidgeon) relates to a method for solid phase membrane mimetics, and more specifically to a stationary phase chromatographic support material designed to mimic the structure of biological cell membranes. The membrane mimetic structure presents a hydrophilic outer portion and a hydrophobic inner portion and is covalently bound to a surface having reactive functional groups. Phospholipids having reactive functional groups on their hydrophobic portion can be used to form the artificial membrane structure. The disclosed support may be used to allow separation of a wide variety of peptides/proteins using an aqueous mobile phase without the added protein-denaturing solvents commonly used in reversed chromatography (RPC) systems.

Despite the technologies disclosed in the above-discussed prior art, there is still a need in this field of novel methods, preferably suitable for large-scale purification of biomolecules.

BRIEF DESCRIPTION OF THE INVENTION

One aspect of the present invention is to provide a separation matrix, which enables high efficiency separation of one or more target compounds from a liquid. Another aspect is to provide such a matrix, which presents a high binding capacity of one or more target compounds. This may be achieved by providing a separation matrix, wherein the ligands have been coupled to the support surface via extenders, and substantially no ligands are present in the interior of the support.

A specific aspect of the invention is to provide a separation matrix, which releases target compounds in smaller volumes of elution liquid than prior art matrices. This may be achieved by the separation matrix according to the invention wherein ligands are present in a thin layer or part only, and not at the interior part of the matrix.

Another specific aspect of the invention is to prepare such a separation matrix, which allows high resolution of peaks in chromatograms. A further aspect is a separation matrix wherein reduced diffusion paths of the target compound(s) results in less flow rate dependence than the prior art products.

Another aspect of the present invention is to provide a method of preparing such a separation matrix. An advantageous aspect of the invention is to provide a method of preparing a high capacity separation matrix according to the invention, in which method a lower total amount of ligand is used as compared to many prior art methods.

A further aspect of the invention is to provide a process of separating at least one target compound from a liquid, which process involves high binding capacity. A specific aspect of the invention is to provide such a process for large scale purification of biomolecules.

An advantageous aspect of the invention is to provide a process of separating at least one target compound from a liquid, which provides shorter equilibration time, and which uses a smaller amount of equilibrium buffer than many prior art methods.

One or more of the aspects above may be achieved by the present invention as defined by the appended claims. Additional aspects and advantages of the invention will appear from the detailed description below.

DEFINITIONS

The term "separation matrix" means herein a material useful for separation of virtually any molecule or compound, which is comprised of a support (carrier) to which ligands (functional groups capable of interaction with other molecules) have been attached.

The term "extender" means herein a chemical entity used to distance ligands from the support and to increase the surface area available for adsorption of target compounds. In this field, "extenders" have also been denoted "flexible arms", "fluff" or "tentacles".

The term "affinity ligand" means herein ligands capable of interacting with a target compound by a "lock-key" type of interaction, such as in antibody-antigen interaction, enzyme-substrate interaction, etc. Thus, affinity ligands commonly interact with a very specific binding involving a number of interaction modes.

The term "multimodal ligands" means ligands which are commonly organic groups smaller than conventional affinity ligands and which have been designed to include more than one interaction such as an ion exchange function combined e.g. with a hydrophobic group.

The term "target compound" means herein any entity which is capable of binding to a separation matrix to allow separation thereof from o liquid. Thus, "compound" may refer to a molecule or any other entity such as a chemical or biological compound. Specific examples of target compounds will be discussed in more detail below.

DETAILED DESCRIPTION OF THE INVENTION

The present invention relates to a novel separation matrix, wherein ligands are provided as a thin shell of a support. The ligands may be coupled directly to the support, or via extenders.

Thus, in a first aspect, the present invention relates to separation matrix, which comprises a support; one or more extenders coupled to an outer part or layer of said support; and at least one ligand coupled to said extenders, wherein the part of the support to which the extenders are coupled constitutes less than 50% of the total volume of the matrix. It is understood that the phrase "coupled to an outer part" in this context means that there are no extenders located at the inner part of said matrix. Thus, the extenders and consequently also the ligands are only present as an outer part or layer, sometimes herein denoted an extender-ligand shell (ELS).

In one embodiment of the separation matrix according to the invention, substantially all the ligands are coupled to the support via the extenders. As the skilled person in this field will understand, the extenders are coupled to the available surface of the support, as will be discussed below in the context of the method of preparing the present support matrix. Further, in this context, it is understood that "at least one" ligand means that there is at least one kind of ligand coupled to the extenders, and it is understood that each support will comprise a plurality of ligands as required to provide separation of a target compound. Similarly, "extenders" refers to a plurality of extender molecules, which may be of the same or different kind.

As appears from the above, the extenders may constitute less than 50% of the matrix (volume/volume), which 50% can be regarded as the outermost half of the matrix. In an advantageous embodiment, the extenders constitute about 15-20%, such as about 17%, of the matrix or within the range of 1-17%.

As the skilled person understands, the exact value of the thickness of the extender layer will depend on the size of the particle. However, in an illustrative embodiment which may be useful e.g. in packed bed chromatography, the extenders are provided as an outer layer having an average thickness which is less than 10 µm, such as in the range of 0.5-10 µm, e.g. 2-3 µm. In one embodiment, the extender layer is in average 3 µm thick.

In an advantageous embodiment of the present separation matrix, the extenders are linear or branched molecules, e.g. as described in the above-discussed U.S. Pat. No. 6,428,707 (Amersham Biosciences AB), or a mixture of linear and branched molecules. Thus, each extender molecule will provide multiple sites allowing the coupling of multiple ligands to each extender. As the skilled person will know, extenders differ from "spacers" or "spacer molecules" in this respect, as each "spacer" commonly will provide one coupling site only for ligands. Thus, in a specific embodiment, in average, each extender molecule will have two or more ligands attached thereto. In one embodiment, the molecular weight of the extenders is in the range of 1000 or 2000 to $20 \times 10^6$, such as 50,000-500,000 Da. Another way of expressing the size of the present extenders is to compare them with dextran of a specified molecular weight, as is customary in this field. Thus, in a specific embodiment, the extenders are of a size corresponding to, or in the close vicinity of, native dextran. The present extenders may be synthetic or native polymers. The extenders may be more hydrophobic or more hydrophilic, provided their nature does not allow them to react with the support. In one embodiment, the extenders are substantially hydrophilic. In this context, it is to be understood that an "essentially hydrophilic" extender as used herein will not present any end or part which can be regarded as hydrophobic. The skilled person can easily decide which extender type to with for a given support. Thus, in one embodiment, the extenders are selected from the group consisting of dextran; dextrin; sucrose polymers; agarose; cellulose, polystyrene, acrylate, methacrylate, acrylamide; polyvinyl alcohol; vinylphenol polymer; and vinyl ether. The present invention also embraces extenders made from any derivatives of the above-discussed. In an alternative embodiment, the extenders are a mixture of two or more of the above-discussed. In an advantageous embodiment, the extenders are agarose molecules, such as functionalised agarose, providing a relatively hydrophilic extender layer. In an alternative embodiment, the extenders are dextran molecules, which have been used frequently in the field of chromatography as extenders. One advantage of the present invention is that the presence of extenders, and consequently ligands, limited to the thin layer provides substantially reduced distances for target compounds to diffuse to and from ligands, as compared to conventional products wherein ligands coupled via extenders are present throughout the support. Thus, both binding and elution can appear faster using the novel separation matrix according to the invention. Consequently, the mass transport kinetics of a process is improved substantially according to the invention as much higher liquid flow rates are enabled, which will benefit the overall process economy. In addition, if the extender is an expensive material, the cost of preparing a separation matrix according to the invention will be an additional advantage of the invention.

The present separation matrix may be provided in any format conventionally used for the separation of target compounds from liquids, such as particles, membranes, filters, monoliths, capillaries etc. In an advantageous embodiment, the separation matrix is comprised of substantially spherical particles, also known as beads. The beads according to the invention may be provided packed in a chromatography column, in a ready to use format.

The beads according to the invention may be of any suitable size, such as in the interval 5-1000 µm in diameter, preferably 10-500 and more preferably 10-100 µm in diameter. An advantageous embodiment of the present invention is a relatively large size bead, such as 100-200 µm in diameter, which beads due to the limited presence of ligands in a thin layer only will present separation properties comparable to the currently marketed much smaller beads.

The support of the separation matrix according to the invention may be porous or non-porous. In an advantageous embodiment, the support is porous. In a specific embodiment, the support is porous but made from crosslinked polymers, which improves its rigidity. This embodiment is advantageous in several respects, such as its rigidity, which enables use thereof at higher liquid flow rates without any risk of collapse. In an alternative embodiment of the present separation matrix, the support is substantially non-porous, i.e. substantially solid.

As the skilled person will understand, the phrase "extenders coupled to an outer part of the support" as used herein may, in the context of a porous support, mean that extenders are coupled to the outer surface as well as to the surfaces of pores present in the outermost part of the particle. Thus, in this embodiment, the extender layer can be regarded as created within the support, especially within the pores of the support, by modifying the outer layer of the support with extenders. In another embodiment, the extender layer will be created as a layer added to the original support by coupling extenders to its outer surface only. Thus, in this last-mentioned embodiment, the added extenders will create a part or layer, resulting in a separation matrix having a size such as a diameter which is greater than that of the support before adding extenders. In the first-mentioned embodiment, the separation matrix may be only marginally larger than the support.

One advantage of the invention is that less buffer is required e.g. for equilibration, which also speeds up such process of equilibration, and for the same reason it will also be faster to wash.

The support may be prepared from any commonly used material, such as synthetic polymers or native polymers, which polymers may be crosslinked to provide rigidity. Thus, in one embodiment, the support is prepared from a native polymer, such as a polysaccharide, e.g. agarose. In another embodiment, the support is prepared from a material selected from the group consisting of agarose, silica, glass, zirconium oxide, and dextran.

The nature of the ligands is not limiting to the broad aspect of the present invention. Thus, in one embodiment of the present separation matrix, the ligands are selected from the group consisting of anion exchangers; cation exchangers; hydrophobic interaction chromatography (HIC) ligands; reversed phase chromatography (RPC) ligands; immobilised metal affinity chromatography (IMAC) ligands; thiophilic ligands; affinity ligands; nucleic acid-based ligands; ligands acting by pi-interactions and/or Van der Waals forces; and multimodal ligands (sometimes denotes mixed mode chromatography ligands).

In one embodiment, the ligands are anion exchangers, such as quaternary ammonium groups (Q groups) or DEAE, or cation exchangers, such as sulphopropyl (SP) or carboxymethyl (CM) groups. In another embodiment, the ligands are multimodal ligands, such as disclosed e.g. in U.S. Pat. No. 7,214,321; WO 03/024588; WO 01/38228; WO 2006/043896; and U.S. Pat. No. 7,008,542.

In another embodiment, the separation matrix according to the invention comprises HIC ligands, such as phenyl or octyl groups. In this embodiment, the complex formed by coupling the hydrophobic ligand groups to an extender, such as dextran, may be designed in a manner that maintains the effect of the dextran extender also at high ionic strengths required for the binding of target compounds. In a specific embodiment, this is achieved by substituting the dextran extenders with zwitterionic groups.

In a further embodiment, the ligands are affinity ligands comprising Protein A, one or more parts of Protein A, or a Protein A mimic. Thus, in a specific embodiment, the ligands may be groups known as non-Fc binders, which are capable of binding Fab fragments of antibodies. Alternatively, the affinity ligands are ligands currently available commercially, such as recombinant or native Protein A, or genetically manipulated Protein A ligands, as available e.g. on MAB-SELECT SURE™ (GE Healthcare Bio-Sciences, Uppsala, Sweden).

In a second aspect, the present invention relates to a method of preparing a separation matrix, which method comprises
(a) providing a support;
(b) providing extenders to which at least one ligand or ligand attachment group has been coupled;
(c) coupling of the extenders to an outer part of said support, wherein the part of the support to which the extenders are coupled constitutes less than 50% of the total volume of the matrix.

The average thickness of the extender part or layer provided in (c) may be as discussed above in the context of the first aspect of the invention. The separation matrix prepared in this aspect may be any one of the above-discussed embodiments of the matrix according to the invention. As the ligands are coupled to the extenders before said extenders are coupled to the support, the presence of ligands will be limited to the extender layer.

In a specific embodiment, the extenders used in the present method are pre-functionalised i.e. provided with ligand attachment groups ("handles") suitable for post-functionalization of the support. Such handles may e.g. be carboxylic groups or NHS groups. Alternatively, the "handles" are allyl groups.

The coupling of extenders to the support may be carried out by any suitable method, but should most advantageously not include any crosslinking of the extenders. In one embodiment of the present method of preparation, in step (b), affinity ligands are attached to the extender via NHS coupling. NHS coupling is well known in this field, see e.g., which method has been suggested for the coupling of Protein A via dextran to surfaces. Thus, in an advantageous embodiment, the affinity ligands which have been coupled using NHS to dextran comprise Protein A, one or more parts of Protein A, or a Protein A mimic.

In another embodiment, the extenders are agarose or agarose-based polymers, and the coupling of ligands is then easily carried out by the skilled person in this field using conventional coupling procedures.

In an advantageous embodiment, the extenders are dextran which has been allylated before attachment thereof to the support. By introduction of allyl groups via pre-allylated dextran to an agarose matrix, it has been shown that the dynamic protein capacity can be significantly improved, compared to using the standard approach of first attaching the extenders and then allylate said attached extenders (see Example 4). The amount of allyl groups introduced can be controlled either by varying the amount of allylated dextran introduced or by varying the level of allylation of the dextran. This route can also be used to avoid potential deleterious effects of the conventional method of reacting the dextran-modified agarose support with allylglycidylether (AGE), and also allows to in a controlled fashion introducing ligands to the dextran layer only. Moreover, introduction of allyl groups to dextran in solution before attachment to the support will allow a more homogeneous distribution of the allyl groups, eventually giving a more homogeneous distribution of the ligands.

The thickness of the extender layer was discussed above. The amount of ligands is easily selected by the skilled person in this field based on considerations of other parameters such as the exact thickness of the extender layer, the size of the extender molecules, binding strength between ligand and target compound etc. In a specific embodiment of the present invention, the separation matrix comprises substantially spherical beads for use in a chromatography column.

In a third aspect, the present invention relates to a process of separating at least one target compound from a liquid, which process comprises
(a) providing a separation matrix which comprises a support, extenders coupled to an outer part of said support, and at least one ligand coupled to said extenders, wherein all ligands are present in said outer part of the support and coupled via extenders;
(b) contacting the liquid with said separation matrix to allow binding of at least one target compound to the ligands; and, optionally,
(c) eluting at least one target compound by adding an eluent liquid which releases said target compound(s) from the liquid.

As will appear from the Examples below, the present process wherein a separation matrix according to the invention is used provides a very high sample capacity, which means that purification of a target compound can be obtained with high productivity.

The separation matrix may comprise a layer of extenders having an average thickness as discussed above in the context of the first aspect of the invention. Further details regarding the separation matrix used in this aspect may be as discussed in the context of the first aspect of the invention above.

In one embodiment, the separation matrix comprises ion exchange ligands, and the present process comprises a step of eluting at least one target compound by gradient elution. Gradient elution which may e.g. be continuous or stepwise is well known in the field of chromatography.

The present process may be used to separate any desired target compound from any liquid. Thus, the liquid may e.g. be a fermentation broth used to culture recombinant host cells, blood or blood plasma, or other biological fluids such as spinal fluid. In one embodiment, the target compound is a desired compound such as a drug or drug candidate, an antigen for use in vaccine production, or a compound for diagnostic use. In an alternative embodiment, the target compound is a compound which it is desired to remove from a product liquid, such as in purifying plasma from a contaminating immunoglobulin. Thus, the present process may be used in bind-elute mode, meaning a mode wherein a desired product is isolated by binding to the separation matrix and then eluted; or, alternatively, in flow-through mode, wherein the desired product passes the separation matrix while contaminating species are bound to the column. Elution of bound species may be carried out in the flow-through mode, wherein contaminating species bound to the matrix are eluted, to allow re-use of the separation matrix.

In one embodiment of the present process, at least one target compound is selected from the group consisting of native and recombinant proteins, such as antibodies; peptides; nucleic acids, such as DNA or RNA, e.g. plasmids; virus, such as adenoassociated virus or influenza virus; and cells, such as eukaryotic or prokaryotic cells. In one embodiment, the molecular weight of at least one target compound is above 30 000, such as above 100 000 g/mol. This embodiment is especially beneficial in large scale purification of biomolecules, as such large compounds are difficult to isolate with process economy in the conventionally used processes. In a specific embodiment, at least one target compound is an immunoglobulin; or a fragment thereof, such as a Fab fragment, or a fusion protein thereof. In a more specific embodiment, the immunoglobulin is a lama immunoglobulin. The immunoglobulin may be a monoclonal or polyclonal antibody.

In one specific embodiment, the present process is a process of isolating antibodies, such as monoclonal antibodies, and the separation matrix is a membrane provided with a thin layer of extenders as discussed above, such as agarose extenders provided with immunoglobulin-binding ligands such as Protein A, or a fragment or fusion protein thereof.

In a last aspect, the present invention relates to a separation matrix which comprises a thin layer of ligands in its outermost layer. Preferably, there are no extenders in its interior parts. Thus, the part of the support to which ligands have been coupled may constitute less than 50% of the matrix (volume/volume), which 50% can be regarded as the outermost half of the matrix. In an advantageous embodiment, the ligands constitute about 15-20%, such as about 17%, of the matrix or within the range of 1-17%. As discussed above in the context of extenders coupled to porous or non-porous supports, the ligand layer may constitute the outer part of a porous support. This aspect involves advantages in terms of buffer savings, shorter diffusion distances and consequently faster processes and excellent binding capacities. Thus, the present inventors have indeed found that such advantages are connected to providing a thin layer of either ligands; or of ligands coupled to extenders.

EXAMPLES

The present examples are presented herein for illustrative purpose only, and should not be constructed to limit the invention as defined by the appended claims.

Introduction

Figure 1:
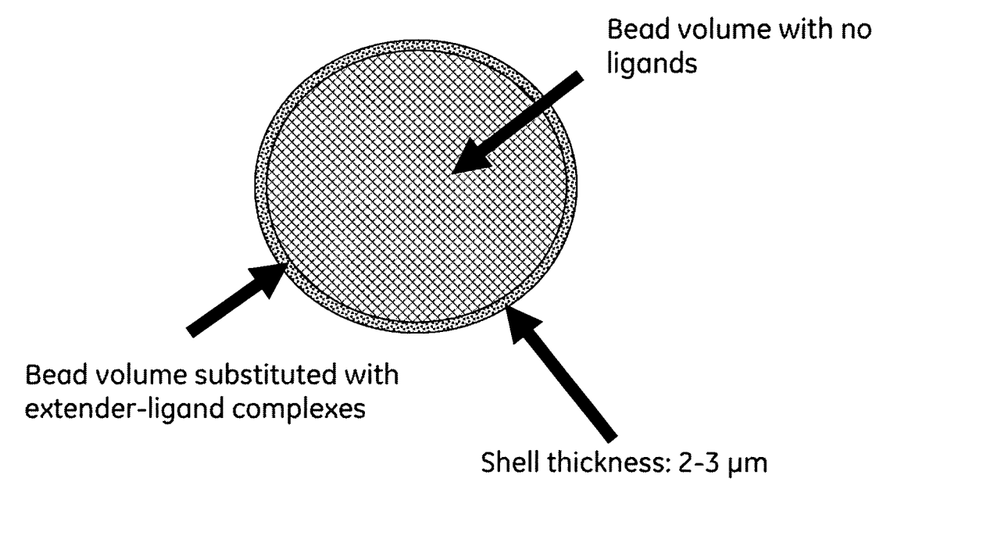
FIG. 1 is an illustrative picture of extender-ligand beads according to the present invention. It appears from the FIGURE how thin the extender layer is in view of the bead, almost like a shell surrounding the spherical particle.

Chromatographic media normally used for large scale purification of biomolecules are substituted with a suitable ligand to accomplish the separation. The ligands are normally homogeneous substituted in the beads in order to adsorb high amounts of sample. However we have found that it is possible to obtain high protein capacities if only a very thin outer layer in the beads is substituted with the ligand (FIG. 1). A prerequisite to obtain high sample capacity of this type of shell-beads is that the ligand is attached to an extender. Furthermore, it is important that the complex [ligand-extender] is coupled to the matrix. Two prototypes were produce with DEAE-dextran attached to a very thin shell (thickness of 2-3 µm) to SEPHAROSE™ 6 Fast Flow. These two prototypes were compared to a prototype were Q-groups (—N(CH$_3$)$_3$) were coupled in a thin shell but without extender. Furthermore, we have also compared the result with DEAE SEPHAROSE™ Fast Flow which is a commercial available media (GE Healthcare, Uppsala, Sweden) where the DEAE groups are homogenously distributed throughout the beads and no extender is used at the production.

General

Volumes of matrix refer to settled bed volume and weights of matrix given in gram refer to suction dry weight. For large scale reaction stirring is referring to a suspended, motor-driven stirrer since the use of magnet bar stirrer is prompt to damage the beads. Small-scale reactions (up to 20 mL or g of gel) were performed in closed vials and stirring refers to the use of a shaking table. Conventional methods were used for the analysis of the functionality and the determination of the degree of allylation, or the degree of amine content on the beads.

One way to prepare a separation matrix according to the invention is exemplified below, starting from a crosslinked agarose gel (SEPHAROSE™ 6 Fast Flow, GE Healthcare, Uppsala, Sweden).

Example 1: Preparation of Shell Media Based on DEAE-Dextran as Shell Ligand (Prototypes D1 and D2)

Allyl Activation of SEPHAROSE™ 6 Fast Flow

SEPHAROSE™ 6 Fast Flow was washed with distilled water on a glass filter. The gel, 250 mL, was drained on the filter and weighed into a 3-necked round bottomed flask. NaOH (115 mL, 50%-solution) was added and mechanical stirring was started. Sodium borohydride, 0.5 g, and sodium sulphate, 31 g, were added to the flask and the slurry heated to 50° C. on a water bath. After approximately one hour, 250 mL of allyl glycidyl ether (AGE) was added. The slurry was then left under vigorously stirring over night. After about 20 hours the slurry was transferred to a glass filter and washed with distilled water (×4), ethanol (×4) and distilled water (×4).

The allyl content was then determined by titration; 272 µmol/mL.

Shell Activation of Prototype D1

Allylated gel, 25 mL, was weighed into a flask and 250 mL of distilled water and 2.5 g sodium acetate was added. 0.21 equivalents of bromine, 75 µL, were dissolved in 20 mL distilled water in a capped vial. This amount of bromine corresponds to a shell thickness of about 2 µm. The bromine solution was momentary added to the allyl gel slurry during vigorous stirring. After approximately 2 minutes the gel was washed with distilled water on a glass filter.

Shell Activation of Prototype D2

Allylated gel, 40 mL, was weighed into a flask and 400 mL of distilled water and 4 g sodium acetate was added. 0.31 equivalents of bromine, 175 µL, were dissolved in 30 mL distilled water in a capped vial. This amount of bromine corresponds to a shell thickness of about 3 µm. The bromine solution was momentary added to the allyl gel slurry during vigorous stirring. After approximately 2 minutes the gel was washed with distilled water on a glass filter.

Shell Coupling of DEAE-Dextran (Prototype D1 and D2)

23.5 mL of the partially brominated gels was dry sucked on a glass filter to 18.5 g and each gel was transferred to a flask and mixed with a solution of 19 g DEAE-Dextran in 32 mL of distilled water for 1 h at room temperature (about 20° C.). DEAE-dextran (molecular weight of 500 000 g/mol) was obtained from GE Healthcare, Uppsala, Sweden.

To each slurry 3.5 mL of 50% NaOH was added. The slurries were heated to 50° C. and stirred over night. After approximately 18 hours the gels were washed with distilled water on a glass filter.

The chloride ion capacity of prototype D1 was 110 μmol/mL. A residual allyl content of 241 μmol/mL corresponds to a theoretical shell thickness of 2 μm.

The chloride ion capacity of prototype D2 was 126 μmol/mL. A residual allyl content of 220 μmol/mL corresponds to a theoretical shell thickness of 3 μm.

Allyl Elimination in the Core of Beads 4 mL of each gel (prototype D1 and D2) were mixed with distilled water in beakers with overhead stirring. Bromine was added until the slurries had a remaining deeply orange/yellow colour. After 3 minutes of stirring, sodium formiate was added until the slurries were completely discoloured. The gels were then washed with distilled water on a glass filter.

Drained brominated gels were transferred to vials and mixed with 2 mL of water and 4 mL of 2 M NaOH. The mixtures were then stirred at 50° C. for 17 h, followed by washing with distilled water on a glass filter.

Example 2: Preparation of Shell Media Based on Q-groups ((—N(CH$_3$)$_3$) as Shell Ligand (Prototype Q)

Allyl Activation of SEPHAROSE™ 6 Fast Flow

SEPHAROSE™ 6 Fast Flow was washed with distilled water on a glass filter. The gel, 250 mL, was drained on the filter and weighed into a 3-necked round bottomed flask. NaOH (115 mL, 50%-solution) was added and mechanical stirring started. Sodium borohydride, 0.5 g, and sodium sulphate, 31 g, were added to the flask and the slurry heated to 50° C. on a water bath. After approximately one hour, 250 mL of allyl glycidyl ether (AGE) was added. The slurry was then left under vigorously stirring over night. After about 20 hours the slurry was transferred to a glass filter and washed with distilled water (×4), ethanol (×4) and distilled water (×4).

The allyl content was then determined by titration; 272 μmol/mL.

Shell Activation of Prototype the Q-prototype

Allylated gel, 40 mL, was weighed into a flask and 400 mL of distilled water and 4 g sodium acetate was added. 0.31 equivalents of bromine, 175 μL, were dissolved in 30 mL distilled water in a capped vial. This amount of bromine corresponds to a shell thickness of about 3 μm. The bromine solution was momentary added to the allyl gel slurry during vigorous stirring. After approximately 2 minutes the gel was washed with distilled water on a glass filter.

Shell Coupling of the Q-groups 15 mL of the partially brominated gel (see above) was transferred to a flask and mixed with 10 mL of water and 6 mL of trimethylammonium chloride solution. pH was adjusted to 12.5 with 50% NaOH and the slurry was heated to 45° C. and left stirring over night. After approximately 18 hours the gel was washed with distilled water on a glass filter.

The chloride ion capacity was estimated to 63 μmol/mL. A residual allyl content of 220 μmol/mL corresponds to a theoretical shell thickness of 3 μm.

Allyl Elimination in the Core of Beads 4 mL of gel (prototype Q) were mixed with distilled water in beakers with overhead stirring. Bromine was added until the slurries had a remaining deeply orange/yellow colour. After 3 minutes of stirring, sodium formiate was added until the slurries were completely discoloured. The gels were then washed with distilled water on a glass filter.

Drained brominated gels were transferred to vials and mixed with 2 mL of water and 4 mL of 2 M NaOH. The mixtures were then stirred at 50° C. for 17 h, followed by washing with distilled water on a glass filter.

Example 3: Chromatographic Evaluation of the Three Prototypes (D1, D2 and Q)

Introduction

To test the chromatographic behaviour of the three shell media prototypes (Prototypes: D1, D2 and Q) the breakthrough capacity of ovalbumin was investigated (see the section Experimental). The result of these prototypes was compared with an established media DEAE SEPHAROSE™ Fast Flow where the ligands are homogenous distributed throughout the beads. The comparison between the D-prototypes and the Q-prototype illustrate the importance of using an extender to obtain high capacities and the advantage of coupling the complex [extender-ligand] to the shell.

Experimental

The shell media to be investigated (Prototypes: D1, D2 and Q), with respect to breakthrough capacity, were packed in TRICORN™ 5/100 columns and the sample solution was pumped at a flow rate of 1.0 mL/min through the column after equilibration with buffer solution. The breakthrough capacity was evaluated at 10% of the maximum UV detector signal (280 nm). The maximum UV signal was estimated by pumping the test solution directly into the detector. The breakthrough capacity at 10% of absorbance maximum ($Q_{b10\%}$) was calculated according to the formula:

$$Q_{b10\%} = (T_{R10\%} - T_{RD}) \times C/V_c$$

where $T_{R10}\%$ is the retention time (min) at 10% of absorbance maximum, $T_{RD}$ the void volume time in the system (min), C the concentration of the sample (4 mg protein/mL) and $V_c$ the column volume (mL). The adsorption buffer used at breakthrough capacity measurements was 50 mM Tris (pH 8.0).

Sample

The sample was ovalbumin dissolved in 50 mM Tris (pH 8.0) and the feed concentration was adjusted to 3.7 mg/ml.

Instrumental

LC System: ÅKTAEXPLORER™ 10
Software: UNICORN™
Column TRICORN™ 5/100
UNICORN™ Method
Main Method:
  0.00 Base CV (2)#Column volume {ml} Any
  0.00 BufferValveA1 A11
  0.00 ColumnPosition (Position2)#ColumnPosition
  0.00 Flow (1.000)#Flow rate {ml/min}
  0.00 Alarm Pressure Enabled (3.00)#Maxpressure {MPa} 0.00 {MPa}
  0.00 Wavelength 280 {nm} 294 {nm} 290 {nm}
  0.00 Message (Obeliex)#ColumnID Noscreen "No sound"
  0.00 OutletValve WasteF1
0.00 Block Equilibration (Equilibration)
  0.00 Base SameAsMain
  0.00 BufferValveA1 A11
  0.00 OutletValve WasteF1
  29.00 AutoZeroUV
  30.00 End_Block
0.00 Block 100_percent_absorbance (100_percent_absorbance)
  0.00 Base Volume
  0.00 Gradient 100 {% B} 0.00 {base}
  0.00 PumpBInlet B1
  0.00 ColumnPosition Position1Bypass 7 End_Block
0.00 Block Loading
  (Loading)
  0.00 Base SameAsMain
  0.00 ColumnPosition (Position2)#col_pos_2
  0.00 Gradient 100 {% B} 0.00 {base}
  0.00 PumpBInlet B1
  0.00 Flow (1)#flow rate load {ml/min}
  0.00 OutletValve (FracF2)#utlopp_loading
  0.00 InjectionMark
  0.20 AutoZeroUV
  1.5 Watch_UV1 Greater_Than (426.0000)#85_percent {mAU} END_BLOCK
  6.00 OutletValve WasteF1
  (64.00)#Max_sample_vol_in_CV End_block
0.00 Block Washing
  (Washing)
  0.00 Base SameAsMain
  0.00 OutletValve WasteF1
  0.00 PumpAInlet A1
  0.00 Gradient 0.00 {% B} 0.00 {base}
  0.00 OutletValve WasteF1
  0.00 Watch_Off UV1
  0.00 BufferValveA1 A11
  0.00 Flow (2.00)#Wash_flow {ml/min}
  3.00 Watch_UV1 Less_Than (25.0000)#5_percent {mAU} END_BLOCK
  (12.00)#Max_wash_vol_in_CV End_block
0.00 Block Elution (Elution)
  0.00 Base SameAsMain
  0.00 PumpAInlet A2
  0.00 PumpWashExplorer OFF ON OFF OFF
  0.00 Watch_Off UV1
  0.00 OutletValve (WasteF1)#Eluate outlet
  0.00 Flow (2.000)#Flow rate elution {ml/min}
  1.00 Watch_UV1 Greater_Than 300 {mAU} END_BLOCK
  (15.00)#Max_elu_vol_in_CV End_Block
0.00 Block Appearance_2
  (Appearance 2)
  0.00 Base SameAsMain
  0.00 PumpAInlet A2
  0.00 Watch_UV1 Less_Than (25.0000)#5_percent_2 {mAU} END_BLOCK
20.00 End_block
0.00 Block CIP
  (CIP)
  0.00 Base SameAsMain 0.00 OutletValve WasteF1 0.00 Watch_Off UV1
  0.00 Gradient 0 {% B} 0.00 {base}
  0.00 PumpWashExplorer A12 OFF OFF OFF 0.00 PumpAInlet A1
  0.00 BufferValveA1 A12
  0.00 Flow (1.000)#Flow rate CIP {ml/min}
60.00 Block Equilibration_3
  (Equilibration_3)
  0.00 Base SameAsMain
  0.00 PumpAInlet A1
    0.00 PumpWashExplorer A11 OFF OFF OFF
  0.00 BufferValveA1 A11
  0.00 Gradient 0.00 {% B} 0.00 {base}
  0.00 Flow (1.000)#Flow_Reequilibration {ml/min} 10.00 End_Block
60.00 End_block
  0.00 End_method Results and Discussion To make improvements to the downstream chromatographic purification platform resulting in major increases to process productivity and protein manufacturing it is highly important to increase the protein capacity of the separation media. To prove that high breakthrough capacities can be achieved with shell beads where the [extender-ligand] complex is substituted in only a very thin shell (FIG. 1), three prototypes were constructed. All three prototypes were based on SEPHAROSE™ 6 Fast Flow (Table 1).

TABLE 1

Three different shell anion-exchange media based on SEPHAROSE ™ 6 Fast Flow.

| Prototype | Shell thickness (μm) | Ligand | Ion exchange capacity (μmol/ml) |
|---|---|---|---|
| D1 | 2 | DEAE-Dextran | 110 |
| D2 | 3 | DEAE-Dextran | 126 |
| Q | 3 | Q | 63 |

According to Table 1, two prototypes substituted with DEAE-dextran and one with Q-groups in the shell were produced. The outer "ligand shell" is very thin but a shell thickness of 3 μm corresponds to about 17% of the total bead volume (the calculation is based on a bead diameter of 100 μm). This means that 83% of the total bead volume (core volume) is not substituted with any ligands. The results of the DEAE-prototypes are extremely good (Table 2) and can partly be explained by the coupling procedure (DEAE-dextran is attached to activated SEPHAROSE™ 6 Fast Flow), short diffusion distances and a high ligand density in the shell.

TABLE 2

The dynamic capacity of ovalbumin for the three different shell anion-exchange media based on SEPHAROSE ™ 6 Fast Flow and DEAE SEPHAROSE ™ Fast Flow.

| Prototype | Shell Thickness (μm) | Dynamic capacity $Q_{B,10\%}$ (mg/mL)$^a$ |
|---|---|---|
| D1 | 2 | 80 |
| D2 | 3 | 78 |
| Q | 3 | 14 |
| DEAE SEPHAROSE ™ Fast Flow | Ligand density uniform throughout the beads | 48 |

$^a$Chromatographic conditions: Column diameter = 0.5 cm, bead height = 10 cm, column volume = 2 ml, Flow rate = 1.0 mL/min (300 cm/h), protein solution = 3.7 mg ovalbumin/mL, Buffer solution = 50 mM tris (pH 8.0)

The low result obtained from prototype Q (nearly 6 times lower compared to prototypes D1 and D2) clearly show that the use of extender is very important to achieve high protein capacities. Furthermore, prototypes D1 and D2 have twice as high dynamic capacity compared to DEAE SEPHAROSE™ Fast Flow (Table 2). The ion exchange capacity of DEAE SEPHAROSE™ is about 130 μmol/mL and the beads are homogeneously substituted with DEAE-groups but without extender. This result proves that the construction principle used for D1 and D2 is very optimal to obtain high protein capacities.

Example 4: Preparation of Shell Media from Pre-allylated Dextran

To prepare a separation matrix according to the invention, agarose support particles were first prepared as described in U.S. Pat. No. 6,602,990 (Berg). Dextran extenders were allylated and subsequently attached to the agarose particles. Sulfopropyl (SP) ligands were then coupled to the allyl groups via conventional technology (1171039A).

A comparative separation matrix (1012076A) was prepared according to standard techniques.

TABLE 3

Representative values of protein capacity for SP media on HFA matrix prepared according to different routes

| Matrix | Ion capacity (μmol/mL) | Capacity for IgG. 50 mM acetate pH 4.75 (mg/mL) | Capacity for Lysozyme. 50 mM acetate pH 4.75 (mg/mL) | Remark |
|---|---|---|---|---|
| 1012076A | 109 | 18 | 71 | SP on dextran extended HFA according to standard procedure |
| 1171039A | 79 | 123 | 69 | Allylated dextran used for introduction of allyl groups and dextran to bead, followed by SP coupling. |

Example 5: Purification of IgG

A separation matrix was prepared according to example 4 above using SEPHAROSE™ 6FF (GE Healthcare) as a support and dextran with molecular weight (Mw) of 150 kD with a allylation degree of 1.3 μmol/g. As appears from Table 4 below, this separation matrix presented unexpectedly high dynamic protein capacity for the protein IgG.

TABLE 4

| Journal number | Matrix | Allyl dextran | Ion capacity (μmol/mL) | $QB_{10}$ for IgG. 50 mM acetate pH 4.75 (mg/mL) | $QB_{80}$ for IgG. 50 mM acetate pH 4.75 (mg/mL) | Recovery of IgG after elution (mg) |
|---|---|---|---|---|---|---|
| 1171069c | 6FF | Nr 4360 Mw 150 kD 1.3 mmol | 25 | 204 | 234 | 195 |

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A separation matrix, comprising,
   a porous support having an outer surface, an outermost part of the support, an interior part of the support, pores present in the outermost part, as well as pores present in the interior part of the support;
   one or more extenders coupled to the outer surface as well as to the surfaces of the pores present in the outermost part of said support forming a shell portion of the support having a thickness in the range of 0.5-10 μm; and
   two or more anion or cation exchange ligands coupled to each of said extenders,
   wherein the molecular weight of the extenders is in the range of 50,000-500,000 Da and the extenders comprise multiple binding sites allowing for coupling of multiple ligands to each of the extenders;
   wherein the shell portion of the support to which the extenders are coupled constitutes 1-17% of the total volume of the matrix, and
   wherein there are substantially no ligands coupled to the pores of the interior part of the support.

2. The separation matrix of claim 1, wherein the extenders are branched molecules.

3. The separation matrix of claim 1, wherein the extenders are selected from the group consisting of agarose; dextran; dextrin; and a mixture of two or more thereof.

4. The separation matrix of claim 1, wherein the support is comprised of substantially spherical particles.

5. The separation matrix of claim 1, wherein the support is prepared from a polysaccharide.

6. The separation matrix of claim 1, wherein the support is prepared from agarose.

7. The separation matrix of claim 1, wherein the extender consists essentially of dextran.

8. The separation matrix of claim 1, wherein the ligands are anion exchange ligands.

9. The separation matrix of claim 1, wherein the ligands are cation exchange ligands.

10. The separation matrix of claim 1, wherein the ligands are coupled to the extenders before the extenders are coupled to the support.

11. The separation matrix of claim 1, wherein the separation matrix is spherical having a diameter of 10-500 μm.

12. A separation matrix, comprising,
    a polysaccharide porous support having an outer surface, an outermost part of the support, an interior part of the support, pores present in the outermost part, as well as pores present in the interior part of the support;
    one or more dextran extenders coupled to the outer surface as well as to the surfaces of pores present in the outermost part of said support forming a shell portion of the support having a thickness in the range of 0.5-10 μm; and
    two or more anion or cation exchange ligands coupled to each of said dextran extenders,
    wherein the molecular weight of the dextran extenders is in the range of 50,000-500,000 Da;
    wherein the shell portion of the support to which the extenders are coupled constitutes 15-20% of the total volume of the matrix, and
    wherein there are substantially no extenders coupled to the pores of the interior part of the polysaccharide support.

13. The separation matrix of claim 12, wherein the extenders are branched dextrans.

14. The separation matrix of claim 12, wherein the support is comprised of substantially spherical particles having a diameter of 100-200 μm.

15. The separation matrix of claim 12, wherein the polysaccharide support is prepared from agarose.

16. The separation matrix of claim 12, wherein the ligands are anion exchange ligands.

17. The separation matrix of claim 12, wherein the ligands are cation exchange ligands.

18. The separation matrix of claim 12, wherein the part of the support to which the extenders are coupled constitutes about 17% of the total volume of the matrix.

19. The separation matrix of claim 1, wherein the dextran extenders are pre-allylated prior to support attachment or the ligands are coupled to the extenders before the extenders are coupled to the support.

20. A spherical separation matrix 100-200 µm in diameter, comprising,
- an agarose porous support having an outer surface, an outermost part of the support, an interior part of the support, pores present in the outermost part, as well as pores present in the interior part of the support;
- one or more dextran extenders coupled to the outer surface as well as to the surfaces of pores present in the outermost part of said support forming a shell portion of the support having a thickness in the range of 2-3 µm; and
- two or more anion or cation exchange ligands coupled to each of said dextran extenders,
- wherein the molecular weight of the dextran extenders is in the range of 50,000-500,000 Da;
- wherein the shell portion of the support to which the extenders are coupled constitutes 15-20% of the total volume of the matrix, wherein the dextran extenders are pre-allylated prior to support attachment or the ligands are coupled to the extenders before the extenders are coupled to the support, and
- wherein there are substantially no extenders coupled to the pores of the interior part of the agarose support.

\* \* \* \* \*